A. McMURTRIE.
HOODED CONNECTOR FOR ELECTRICAL CONDUITS AND THE LIKE.
APPLICATION FILED SEPT. 8, 1908.
916,932.
Patented Mar. 30, 1909.
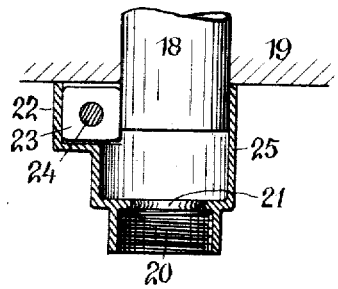
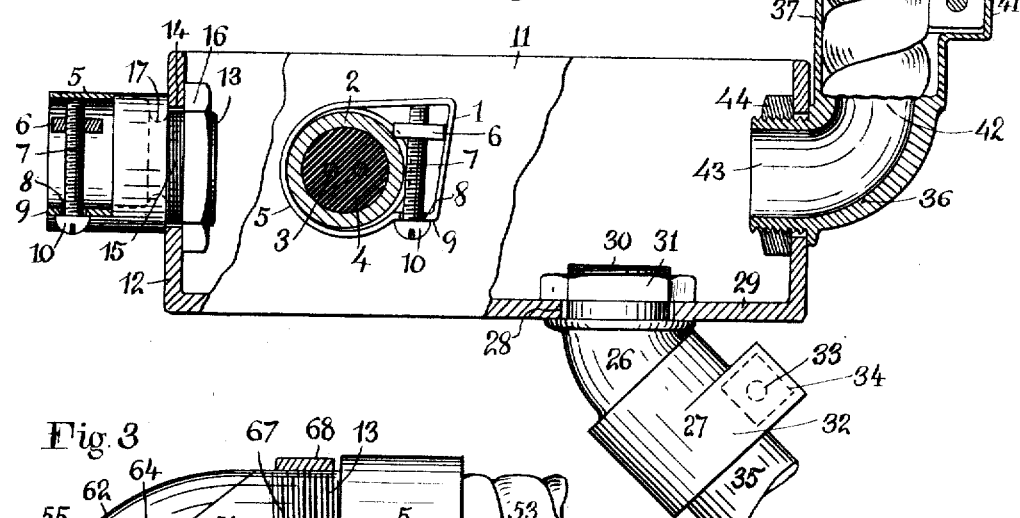
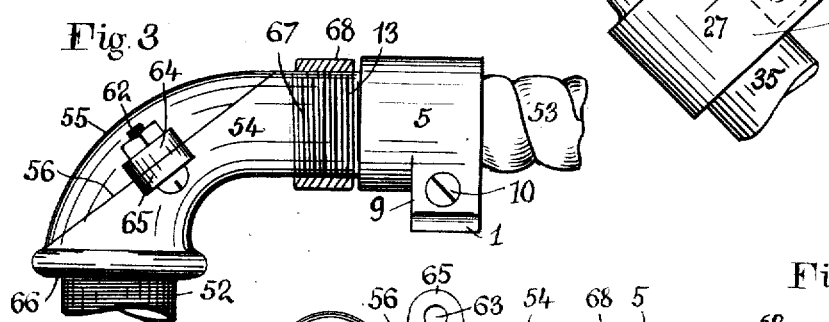
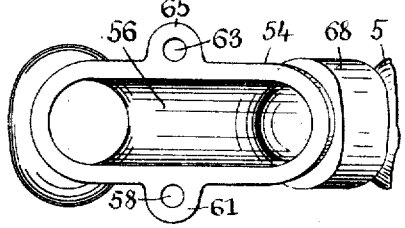
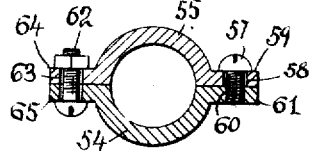
Witnesses
Ivan Konigsberg
George L. Pafort.
Adrah McMurtrie Inventor
By his Attorney
Alexander C. Proudfit

UNITED STATES PATENT OFFICE.

ADNAH McMURTRIE, OF NEW YORK, N. Y., ASSIGNOR TO THOMAS & BETTS COMPANY, OF NEW YORK, N. Y., A CORPORATION OF NEW YORK.

HOODED CONNECTOR FOR ELECTRICAL CONDUITS AND THE LIKE.

No. 916,932.

Specification of Letters Patent.

Patented March 30, 1909.

Original application filed December 13, 1907, Serial No. 406,261. Divided and this application filed September 8, 1908. Serial No. 451,940.

*To all whom it may concern:*

Be it known that I, ADNAH MCMURTRIE, of New York, N. Y., have invented certain Improvements in Hooded Connectors for Electrical Conduits and the Like, of which the following description, in connection with the accompanying drawings, is a specification, like numerals on the drawings designating like parts.

This invention relates to electrical conduit and particularly to the connectors or bushings used at the ends of armor tubes or sheaths to provide a smooth exit for the conductors, and used also to couple or connect adjacent conduit members, whether a plurality of sheaths or a sheath and another form of conduit member such as an outlet box.

By the term "sheath" as used hereinafter I intend to designate any form of tubular member, whether formed as a unitary structure with the conductor, as in the so called "armored conductors" or having a separate indentity as in the various forms of armor conduit, or other tubular members.

The expense of providing sheaths with screw threads, the cost of threaded fittings, the expensive labor required to install threaded connectors, and the lack of adaptability of threaded connections to numerous types of sheaths in general use, have made a universal, threadless coupling a desideratum, but many of the devices advanced to meet this need have failed to provide for the requisite grip upon the sheaths necessary to secure mechanical union, and the abrasive engagement of the conduit members requisite to insure electrical connection, while such connective devices as set screws normal to the periphery of the sheath have proved too powerful an expedient in the hands of the average workman, and sheaths have been crushed or pierced and the intended protection converted into a positive detriment to insulation.

Accordingly, an important object of my present invention is to provide a form of connective device which will be capable of substantially universal adaptation to the exigencies of electrical house wiring and similar fields, and which embodies the mechanical features necessary to secure strong physical union of the members to be connected and also the requisite degree of electrical connection, without recourse to threaded unions or destructive set screws normal to the sheaths.

Another important object of my invention is so to construct the connective device as to facilitate its application to sheaths in situations where the use of threaded unions would be difficult to effect, as by reason of the inadequacy of the projecting sheath-end to receive a die for the formation of a screw thread of sufficient length to hold a coupling, or where the rotation of one or more of the members is rendered difficult or impossible by their angular relation to each other, or their confined situation, and in many other instances which occur frequently in the daily experience of those skilled in the art.

In its broadest aspect, my invention consists of an attachment for sheaths, provided with an abutment to be supported near the periphery of the sheath, and between which and the sheath plays a wedge member, with means to force the wedge member into wedging relation with the abutment and sheath, thus connecting them mechanically, and preferably electrically.

Generic claims upon my invention, thus broadly considered are included in my application for United States Patent, Serial No. 406,261, filed December 13, 1907, from which this present application has been divided.

The various features of the invention comprised in my present application will be illustrated and described fully in the accompanying drawings and specification and pointed out in the claims.

In the drawings, Figure 1 shows in side elevation, partly in section, an outlet box of well-known form, and in place thereon a number of connectors in the construction of which my invention has been embodied; Fig. 2 shows in vertical section a similar connector applied to the projecting stub of a pipe too short to receive an adequate screw thread; Figs. 3, 4 and 5 are views in side elevation, plan, and cross section respectively of a modified form of connector to be described hereinafter in detail.

In the embodiment of my invention selected for illustration and description as a convenient form to enable ready and complete understanding of my improvements, the part designated by the reference numeral 1 is an abutment which in accordance with my invention is supported near the sheath 2 to which my novel attachment is to be secured and which in the instance illustrated is constituted by the spirally wound, tubular metallic sheath of a well-known form of armored conductor, the reference numerals 3 and 4 designating the conductors and their insulation respectively.

The support of the abutment may be provided by any suitable means and as one convenient form of such means I have shown a housing 5 to receive and surround the end of the sheath 2, forming a seat therefor, the abutment 1 being in this case formed integrally with the housing as a portion of its wall, and preferably slightly inclined relatively to the vertical diameter of the sheath.

The sheath 2 usually fits somewhat loosely in the seat 5, and to secure the sheath and attachment together firmly I provide a wedge member 6 to play between the abutment 1 and the sheath 2; also means 7 to force the wedge member into binding engagement with the sheath and abutment respectively, the wedge member 6 and means just described comprising in the instance illustrated a "stove bolt" of which 6 is the nut and 7 the draft screw, the shank of the latter passing through a hole 8 in a shoulder 9 formed in the wall of the housing to serve as a base for the screw head 10.

In operation, the screw is rotated to the right and draws the wedge member 6 into the converging pocket formed by the abutment and the neighboring wall of the sheath 2, such being the strength of the draft exercised that the nut 6, riding upon the inclined abutment 1, is forced over against the sheath 2 and crowds the latter into binding engagement with the seat 5, the nut also cutting into the periphery of the sheath and making electrical connection between the sheath and the housing, when as I prefer the housing is made of metal.

In Fig. 1, the attachments are shown in position to secure sheaths to the walls 11 and 12 of an electrical outlet box, and to facilitate such unions the attachments are illustrated as having integral attaching portions 13 reduced in diameter to enter the usual apertures 14 and having threaded necks 15 on which are seated retaining nuts 16, while 17 is a rounded protective shoulder to prevent abrasion of the insulation of a conductor.

The length of contact between nut 6 and the sheath not only affords an ample surface for binding engagement but also distributes the strain and prevents puncture or deformation of the sheath by the nut, a characteristic fault accompanying the use of set screws normal to the periphery of the sheath when applied by an unskilled workman. Fig. 2 illustrates an instance where this extended region of engagement affords means to grip efficiently a very short projecting stub 18 of pipe below a ceiling 19, no opportunity being given here to work a screw-threading die on the pipe end. Special coupling devices have been utilized heretofore in connection with such pipe stubs, but these devices have been complicated in construction and unsatisfactory in operation. In this figure, 20 designates a female threaded attaching neck or portion to receive the threaded end of a pipe, and 21 designates a rounded protective shoulder to prevent abrasion of the conductor led therethrough, the whole forming a very compact, neat housing with the operating parts accessible but unobtrusive. The abutment is designated in this figure by the reference numeral 22, while 23 refers to the wedge member, 24 to the draft screw, and 25 to the seat, all similar to parts already described under the same names.

I have illustrated at the right hand side of the outlet box in Fig. 1 two instances where the direction from which the sheath approaches the box is a factor that renders difficult the connection of the sheath to the box by the ordinary devices available, but this connection can be readily effected by means of the special forms of connective devices shown in Fig. 1 and in the construction of which my invention has been embodied. In the instance of the attachment designated by the reference numeral 26 the neck to which that numeral refers is bent to present the mouth of the housing 27 at an angle of about 45° to the axis of the aperture 28 in the bottom 29 of the box, to which the attaching portion 30 of the device is secured by a nut 31, the abutment 32, bolt 33 and nut 34 corresponding exactly in construction to the similar parts already described. It is obvious that no attachment requiring rotative application to the sheath 35 could be secured in place as conveniently as by the means embodied in my novel connective device, which makes possible the angularly arranged fitting illustrated. A similar fitting is shown at 36 where the curvature amounts to 90° and the advantage is still more marked. In this fitting the seat portion 37 is elongated considerably to allow for less accurate termination of the sheath 38, as the degree of entrance of the sheath within the housing does not affect the ease and efficiency with which the nut 39 is drawn by the bolt 40 against the abutment 41 and into engagement with the sheath 38 as already described with reference to the other forms of my device. The shoulder 42, attaching neck 43 and retaining nut 44 are also similar to like parts already described.

In Figs. 3, 4 and 5, I have illustrated a fitting especially adapted for use in situations where it is desirable to draw a conductor outward axially rather than around a bend, this fitting resembling in general contour that shown at the extreme right of Fig. 1, but applied to couple a screw threaded armor tube 52 to a flexible armor tube 53 at an angle of 90°. In accordance with my invention the elbow 54 is provided with a removable cap 55 secured by suitable fastening means over an oval aperture 56 through which right line or axial access may be had to the tubes 52 and 53. In the instance illustrated the fastening means takes the form of a screw 57 (see Fig. 5) passing through a plain hole 58 in a lug 59 of the cap 55 into a threaded hole 60 in a lug 61 on the elbow 54, so that when the screw 57 is loosened, the cap can be swung around on the screw as a pivot. A bolt 62 passing through plain holes 63 in the cap lug 64 and elbow lug 65 respectively may also be provided to supplement the screw 57 or in place of it. The tube 52 is shown as screwed directly into the elbow at 66, while the tube 53 is provided with an attachment of the form first herein described and which is coupled to the threaded end 67 of the elbow 54 by a short ring or coupling 68. Other forms of connective devices may be utilized as desired and found suitable with my improved elbow.

Having illustrated and described my invention thus fully and suitable means for carrying the same into effect, it will be understood that I do not limit myself to the specific materials nor to the specific forms of construction herein described and illustrated, otherwise than as set forth in the claims, read in connection with this specification.

What I claim and desire to secure by Letters Patent is:—

1. An attachment of the class described; comprising a housing to receive a sheath and provided with an attaching portion angularly disposed relatively to said sheath receiving portion; said housing having an abutment, a coöperating nut to be wedged between said abutment and sheath, and a draft screw to force said nut into said wedging position to secure said sheath and attachment together.

2. An attachment of the class described; comprising a housing having a threaded attaching neck and provided with binding means including an actuating member, an engaging member thereon; and means to support said actuating member and binding member adjacent the path of the article with which attachment is to be effected, to permit transverse, tangential traversal by said binding member of a portion of said path, upon, and by means of, movement of said actuating member to move said binding member into binding engagement with said article, to couple together said article and attaching means; substantially as described.

3. An attachment of the class described; comprising a housing to receive a sheath and having a threaded neck to pass an aperture in a plate and arranged to receive a retaining nut upon the n ction projecting beyond said plate away fi    aid housing; a screw supported on saiu   using in transverse relation to said sheath housing; and an engaging member arranged to be moved tangentially into binding engagement with said sheath by the rotation of said screw; substantially as described.

4. The combination with an outlet box or conduit member of the class described, having a seat for a tubular sheath; of a binding device comprising a screw provided with a nut, and means to support said screw adjacent said seat with said nut in position to traverse the path of said sheath tangentially upon rotation of said screw to bind said sheath and conduit member together; substantially as described.

5. The combination with an outlet box or conduit member of a connecting device of the class described; comprising a seat and a binding device consisting of a screw provided with a nut, and means to support said screw adjacent said seat with said nut in position to traverse the path of said sheath tangentially upon rotation of said screw to bind said sheath and connecting device together; substantially as described.

6. An attachment of the class described; comprising a housing having a threaded attaching neck angularly disposed relatively to said housing; said housing being constructed and arranged to receive the article to which attachment is to be effected, and having an abutment, a coöperating nut to be wedged between said abutment and sheath, and a draft screw to force said nut into said wedging position to secure said sheath and attachment together; substantially as described.

Signed at New York in the county and State of New York this third day of August, 1908.

ADNAH McMURTRIE.

Witnesses:
R. P. HARRISON,
WM. H. McCORMICK.